United States Patent [19]

Olliges

[11] Patent Number: 4,728,019
[45] Date of Patent: Mar. 1, 1988

[54] AUTOMOBILE ROOF CARRIER

[76] Inventor: Michael J. Olliges, 5325 Ravenna Pl. NE., Apt. 1, Seattle, Wash. 98105

[21] Appl. No.: 920,903

[22] Filed: Oct. 17, 1986

Related U.S. Application Data

[63] Continuation of Ser. No. 694,694, Jan. 25, 1985, abandoned.

[51] Int. Cl.$^4$ .................................................. B60R 9/00
[52] U.S. Cl. ..................... 224/329; 224/315; 224/323; 224/320
[58] Field of Search ............... 224/309, 319, 329, 321, 224/322, 323, 324, 315, 320, 331; 211/70.5

[56] References Cited

U.S. PATENT DOCUMENTS

| | | | |
|---|---|---|---|
| 2,630,257 | 3/1953 | Nielsen | 224/42.1 |
| 2,731,181 | 1/1956 | Binding | 224/42.1 |
| 2,772,824 | 12/1956 | Binding | 224/42.1 |
| 2,853,119 | 9/1958 | Balfour | 155/5 |
| 3,064,868 | 11/1962 | Treydte | 224/42.1 |
| 3,366,296 | 1/1968 | Feinstein | 224/42.1 |
| 3,385,488 | 5/1968 | Bronson | 224/42.1 |
| 3,638,844 | 2/1972 | Bronson | 224/42.1 F |
| 3,685,061 | 8/1972 | Wray | 224/321 |
| 3,702,167 | 11/1972 | Olson | 224/42.1 E |
| 3,710,998 | 1/1973 | Marker | 224/42.1 F |
| 3,836,058 | 9/1974 | Penniman et al. | 224/41.1 F |
| 3,897,895 | 8/1975 | Read | 224/42.1 B |
| 3,920,167 | 11/1975 | Parsons | 224/42.1 F |
| 4,077,553 | 3/1978 | Miller | 224/42.1 G |
| 4,226,351 | 10/1980 | Biermann et al. | 224/325 |
| 4,289,260 | 9/1981 | Zoor | 224/315 |
| 4,295,587 | 10/1981 | Bott | 224/321 |
| 4,312,467 | 1/1982 | Kulwin | 224/315 |
| 4,401,247 | 8/1983 | Zoor | 224/315 |
| 4,432,480 | 2/1984 | Kimmel | 224/329 |
| 4,449,656 | 5/1984 | Wouden | 224/320 |
| 4,456,158 | 6/1984 | Wertz | 224/316 |

Primary Examiner—Henry J. Recla
Assistant Examiner—David Voorhees
Attorney, Agent, or Firm—Bruce A. Kaser

[57] ABSTRACT

An automobile roof carrier (10) includes an elongated carrier bar (12) transversely extending across the roof (18) of an automobile. The carrier bar (12) is supported at each end by a fastening device (14) which is attached to a generally trough-shaped rain gutter (20) on a lateral border of the roof (18). The fastening device (14) includes a supporting leg (22) having an upper portion (24) connected to the carrier bar (12). The supporting leg (22) also has a lower portion (26) connected to the rain gutter trough (20). The lower portion (26) is pivotally connected to the upper portion (24) so that the lower portion has two degrees of pivotal movement relative to the upper portion. An interchangeable article carrier (16) is mounted to the top of the carrier bar (12).

5 Claims, 10 Drawing Figures

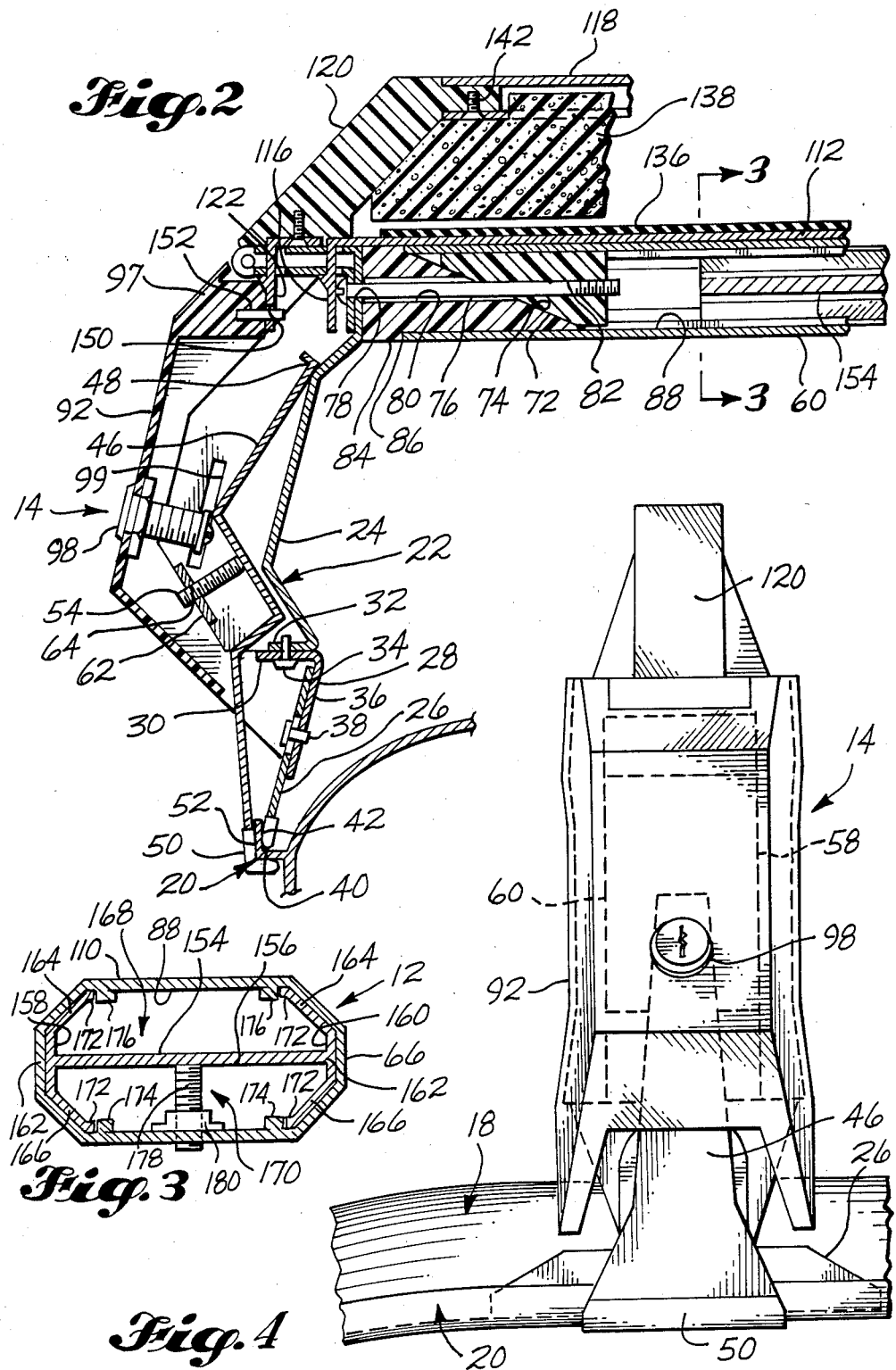

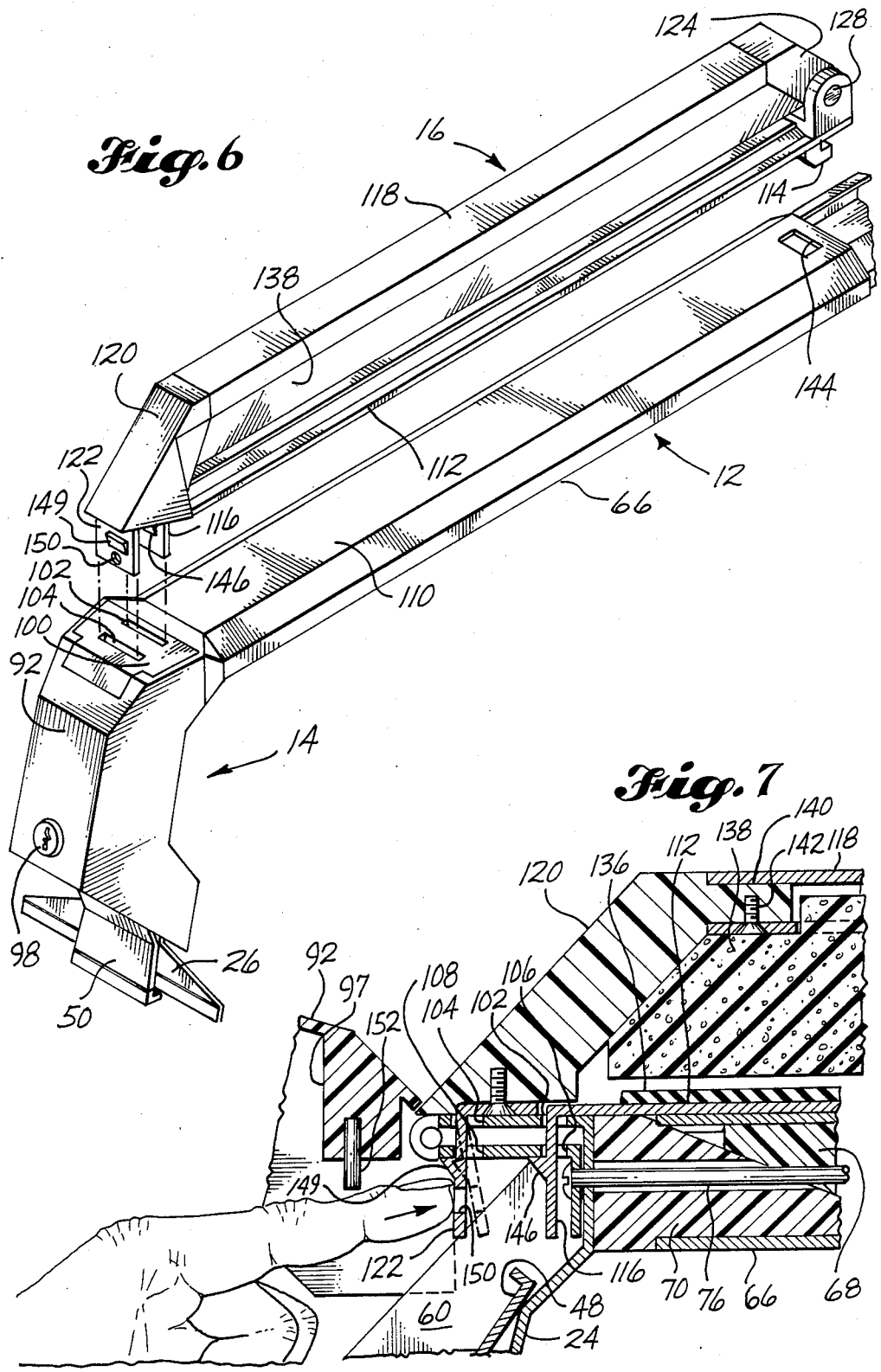

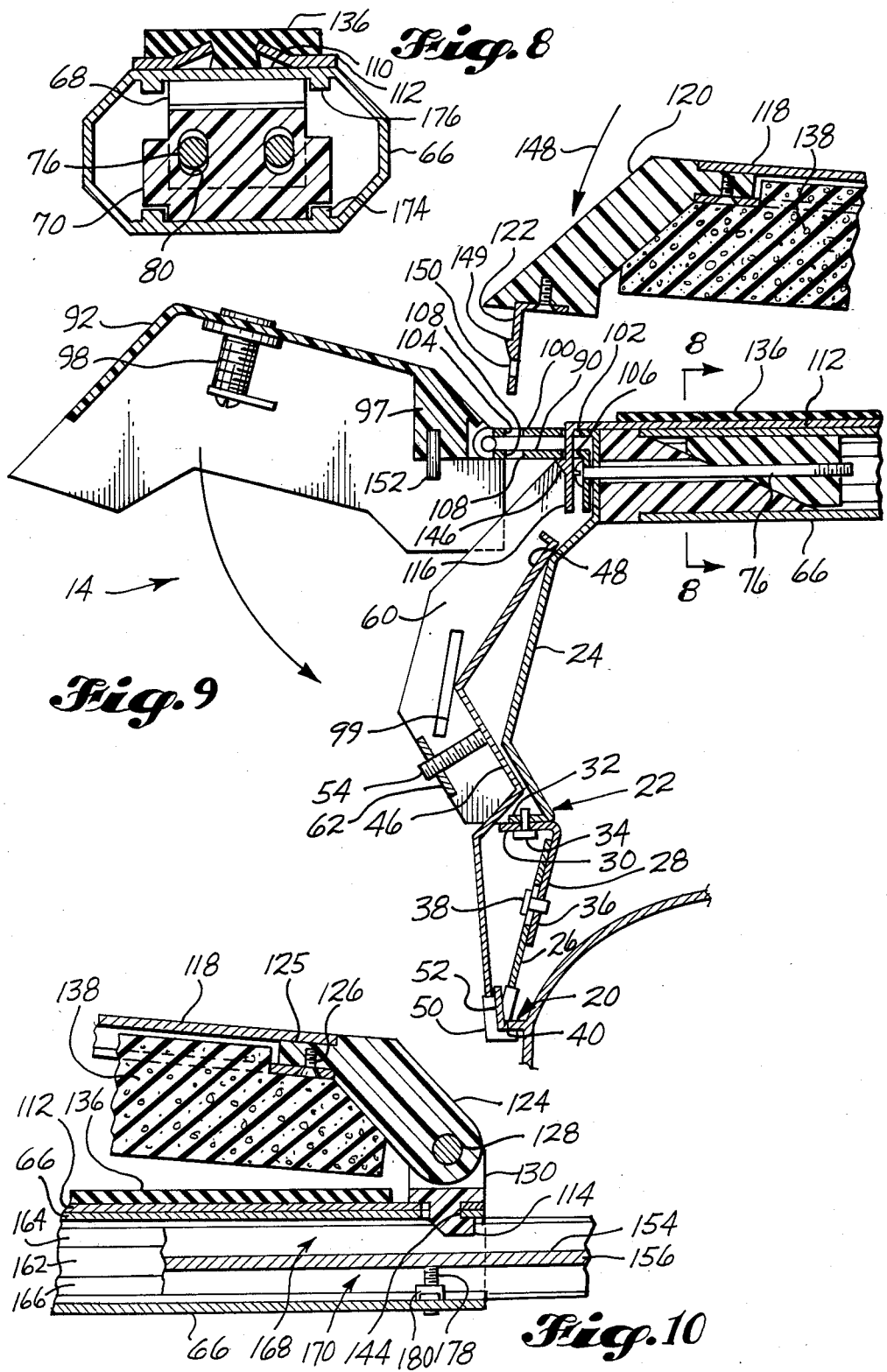

AUTOMOBILE ROOF CARRIER

This application is a continuation of application Ser. No. 694,694, filed Jan. 26, 1985 and now abandoned.

TECHNICAL FIELD

This invention relates to automobile roof carriers. In particular, the invention relates to a roof carrier that is mountable to an automobile roof by means of attachment to rain gutters that border the roof.

BACKGROUND ART

Automobile roof carriers have long been known in the art. Such carriers are typically used for carrying and transporting skis, bicycles, luggage, or the like. There are several design difficulties and objectives common to all of such carriers. For example, it is desirable to design a roof carrier that is sturdy and of a lightweight construction, and which can be securely fastened to an automobile roof. Such a carrier should be designed so that it is easy to attach and detach from the roof. In association with this, in those carriers consisting of two separate carrier bars not attached to each other, each carrier bar must have the capability to be fastened to the roof in a manner so that both bars are parallel with respect to each other. Furthermore, each bar must have a proper vertical and crosswise orientation with respect to the roof. These problems have all been addressed at various times in the art, and are problems with which the present invention is concerned.

A list of U.S. patents known to be pertinent to the prior art is as follows: U.S. Pat. Nos. 2,630,257 issued to C. I. Nielsen on Mar. 3, 1953; 2,731,181 issued to K. W. Binding on Jan. 17, 1956; 2,772,824 issued to K. W. Binding on Dec. 4, 1956; 2,853,119 issued to L. M. J. Balfour on Sept. 23, 1958; 3,064,868 issued to P. E. Treydte on Nov. 20, 1962; 3,366,296 issued to B. Feinstein et al on Jan. 30, 1968; 3,385,488 issued to J. Bronson on May 28, 1968; 3,638,844 issued to Bronson on Feb. 1, 1972; 3,702,167 issued to Olson on Nov. 7, 1972; 3,710,998 issued to Marker on Jan. 16, 1973; 3,836,058 issued to Penniman et al on Sept. 17, 1974; 3,897,895 issued to Read on Aug. 5, 1975; 3,920,167 issued to Parsons on Nov. 18, 1975; 4,077,553 issued to Miller on Mar. 7, 1978; 4,226,351 issued to Biermann et al on Oct. 7, 1980; 4,289,260 issued to Zoor on Sept. 15, 1981; 4,295,587 issued to Bott on Oct. 20, 1981; 4,312,467 issued to Kulwin on Jan. 26, 1982; 4,401,247 issued to Zoor on Aug. 30, 1983; 4,432,480 issued to Kimmel on Feb. 21, 1984; 4,449,656 issued to Wouden on May 22, 1984; and U.S. Pat. No. 4,456,158 issued to Wertz et al on June 26, 1984.

DISCLOSURE OF THE INVENTION

The present invention includes an automobile roof carrier having an elongated carrier bar transversely extending across the roof of an automobile. The carrier bar is supported at each end by a fastening device that is attached to a generally trough-shaped rain gutter running along each lateral border of the roof. In basic form, the fastening device includes a leg which supports an end of the carrier bar, wherein the leg includes an upper and a lower portion. The upper portion is connected to the carrier bar. The lower portion has a rain gutter-engaging end shaped to fit adjacent an inner surface of the rain gutter trough. Such supporting leg further includes a means for pivotally connecting the lower portion of the leg to its upper portion so that the lower portion has two degrees of freedom of pivotal movement relative to the upper portion. The supporting leg is provided with a means for securing the gutter-engaging end of the lower portion to the rain gutter trough, which thereby fastens the leg to the rain gutter.

For permitting the pivotal movement described above, an angled bracket member connects the upper portion to the lower portion. The bracket member includes a first arm portion pivotally connected to the supporting leg's upper portion, for both supporting the upper portion and for permitting it to pivot about a first axis. Such pivoting movement would, for example, be used to adjust the angular or crosswise position of the carrier bar with respect to the automobile roof. The bracket member also includes a second arm portion which is inclined at an angle relative to the bracket member's first arm portion. This second arm portion is pivotally connected to the lower portion of the supporting leg, in a manner so that the lower portion may pivot about a second axis. This last pivotal movement may be used to adjust the position of the rain gutter-engaging end adjacent the inner surface of the rain gutter trough. It also permits the upper portion of the supporting leg to be positioned erect with respect to the side of the roof, even though the fastening device is attached to a rain gutter portion that is not level with respect to the roof.

The means for securing the supporting leg to the rain gutter includes a clamping member generally spaced from the supporting leg, with the exception of a first end of such member which is positioned in abutting relationship against the supporting leg's upper portion, and a second end which is positioned in abutting relationship against an outside surface of the rain gutter trough. The second end is shaped so that it will complimentarily fit adjacent the trough outside surface. A tightening means, preferably a tightening screw, presses the clamping member toward the supporting leg so that its first end is pushed against the upper portion and its second end is pushed against the outer surface of the trough. This causes the clamping member's second end to cooperate with the gutter-engaging end of the supporting leg portion, to secure the fastening device to the rain gutter.

The clamping member is a member that could be described as one which "freely floats" relative to the supporting leg. That is, the tightening screw pushes the clamping member against the supporting leg and is the only thing that holds the clamping member against the leg. When the tightening screw is loosened, the clamping member is free to move a nominal amount upwardly and downwardly relative to the supporting leg. This permits the better adaptation of the second end of the clamping member to rain gutters of various sizes.

The roof carrier also includes an article carrier, for carrying such articles as skis, bicycles, etc., that is interchangeably mountable to the roof carrier. The article carrier comprises an elongated support member having a hook portion, and a latching portion which is spaced a distance from the hook portion. A slot is located in a top surface of the carrier bar, and the hook portion is engageable therewith for connecting the support member to the carrier bar. The upper portion of the supporting leg, which is connected to the end of the carrier bar, includes a means for latching the latching portion of the support member to such upper portion. Such latching, along with engagement of the hook portion in the slot, holds the support member adjacent the top surface of the carrier bar.

The means for latching the support member includes an opening in the supporting leg's upper portion. The latching portion of the support member includes a downwardly depending latching member that is sized for insertion through this opening. After insertion of the latching member, a means for fastening the latching member holds it in position. Such fastening means may, for example, be an outwardly projecting beaded portion of the latching member wherein such beaded portion catches an edge of the opening after the latching member has been inserted therethrough. The latching member is a flexible member and can bend relative to the elongated support member so that bending the latching member may uncatch the beaded portion from the edge of the opening, thereby releasing the latching member.

Certain types of article carriers may include an elongated keeper bar which, for example, could be used to attach a ski to the elongated support member. In preferred form, such a keeper bar has an end pivotally connected to the support member. This permits the keeper bar to swing back and forth between a closed position adjacent the support member, and an open position away from the support member. When the keeper bar is in the closed position, a portion of the other end of the keeper bar extends outwardly from that end of the support member which is closest to its latching member. In a manner similar to the support member, this keeper bar end portion also includes a latching portion which may be latched to the upper portion of the supporting leg. Thus, the latching portion of the keeper bar may, for example, be in the form of a latching member which depends downwardly and is inserted through a second opening in the supporting leg's upper portion. The means for fastening such keeper bar latching member would be the same as that which was described above for the latching member of the elongated support member.

The roof carrier fastening device also includes a housing shaped to cover the upper portion of the supporting leg, and it also covers both the tightening screw which presses against the clamping member, and the angled bracket member. The housing is pivotally connected to the supporting leg's upper portion for swinging between a closed or covering position and an open or uncovering position.

Included in the downwardly depending latching member of the end portion of the keeper bar, or in the latching member of the elongated support member if such member does not have a keeper bar, is a socket opening which is located below the opening to which the beaded portion of the latching member catches. A pin member is mounted to the housing of the fastening device in a position so that when the housing is swung into a covering position, the pin member registers with such socket opening. Such registration locks the latching member which prevents it from becoming accidently unlatched, unless the housing is swung into an open or uncovering position. The housing may be locked when in the covering position which insures that there will be no unauthorized removal of articles held by the article carrier.

The carrier bar is constructed of an inner elongated I-beam member that is surrounded by an outer elongated tubular member. The inner I-beam member has a horizontal web portion that connects a pair of flange portions. The outer member is shaped to complimentarily fit adjacent the outer surfaces of the flange portions and is in sliding contact therewith. This permits movement of the outer member relative to the inner member so that the carrier bar can be extended or retracted to properly fit the roof carrier to automobile roofs having various sizes.

The top surface of the outer tubular member is substantially flat and includes the slot to which the hook portion of the elongated support member engages. The outer tubular member and the horizontal web portion of the I-beam define upper and lower chambers in the carrier bar, wherein when the hook portion of the article support member is engaged with the slot, the hook extends through the slot and the upper chamber provides a space therefor.

Each flange portion of the I-beam has a vertical portion connected to its horizontal web portion. Each flange portion further has an upwardly and inwardly directed portion, and a downwardly and inwardly directed portion. Since the outer tubular member is sized to complimentarily fit adjacent the outer surfaces of these flange portions, this construction provides an extendable or retractable carrier bar that is sturdy, but one which can be constructed of lightweight materials.

Different automobile designs incorporate various rain gutters that are neither level nor parallel. An advantage to the present invention is that the two degrees of freedom of pivotal movement in the supporting leg of the fastening device permits the carrier bar to be properly attached to a wide variety of rain gutters on many different automobiles. Further, such pivoting movement insures that one carrier bar will have the same crosswise and vertical alignment as another carrier bar, so that they may cooperate with each other to carry an article.

Another advantage of the present invention is that it provides a fastening device that is easy to connect and disconnect from a rain gutter. By simply tightening or untightening the screw adjacent the clamping member the fastening device can be easily attached or removed.

Still another advantage of the present invention is that the article carrier is easily interchangeable for different uses. One article carrier, for example, may be designed to carry skis, while another article carrier may be designed to carry a bicycle. The means by which the elongated support member for each article carrier is hooked and latched to the roof carrier makes attachment and removal simple. Further, and a very important feature of the present invention is that different article carriers can be attached or removed to and from a carrier bar without removal of the bar from the automobile roof. Interchangeable article carrier designs therefore adapt the roof carrier for use in a wide variety of situations, including multi-seasonal use, thereby enhancing its value to the owner.

Still another advantage to the present invention is that the pivotal connection of the housing to the upper portion of the supporting leg permits locking both the article carrier and the fastening device by one simple movement. As will become apparent after reading the description, the pin member, which is connected to the housing, may be used to lock either the latching member of the elongated article support member or the latching member of the keeper bar, depending on the type of article carrier used. Locking the housing in covering position also prevents the unauthorized unscrewing of the tightening screw from the clamping member.

These advantages, and others, will become more readily apparent to the reader after reading the following parts of this application.

BRIEF DESCRIPTION OF THE DRAWINGS

Referring now to the drawings, like reference numerals refer to like parts throughout the various views, and wherein:

FIG. 2 is an enlarged fragmentary cross-sectional view of an end of one of the carrier bars of the roof top carried shown in FIG. 1, and shows a fastening device connecting the end of the carrier bar to a generally trough shaped roof gutter, and an end of an article carrier latched to the fastening device;

FIG. 3 is an enlarged cross-sectional view of the carrier bar shown in FIG. 2 and is taken along line 3—3 in FIG. 2;

FIG. 4 is an end view of the fastening device and carrier bar shown in FIG. 2, and shows the fastening device secured to a curved rain gutter, wherein a lower portion of the fastening device is slightly pivoted to keep the fastening device in an erect position relative to the roof;

FIG. 6 is a non-exploded pictorial view of the fastener device, carrier bar, and article carrier shown in FIG. 5;

FIG. 7 is an enlarged fragmentary cross-sectional view of the fastening device and carrier bar shown in FIG. 2, and shows the pivotal connection of a housing to an upper portion of the fastening device, wherein the housing is shown in an open position uncovering the device so that such upper portion is hand accessible for opening an article carrier keeper bar;

FIG. 8 is an enlarged cross-sectional view of the carrier bar of FIGS. 2–3 and 5–7 taken along line 8—8 in FIG. 9, and shows the means by which the fastening device is connected to the end of the carrier bar;

FIG. 9 is a view much like FIGS. 2 and 7, and shows the housing pivoted away from the fastening device, and further shows an end of the keeper bar swung away from the elongated support member of the article carrier; and FIG. 10 is an enlarged fragmentary cross-sectional view of the right end of the article carrier and carrier bar shown in FIGS. 5 and 6.

BEST MODE FOR CARRYING OUT THE INVENTION

Figure 1:
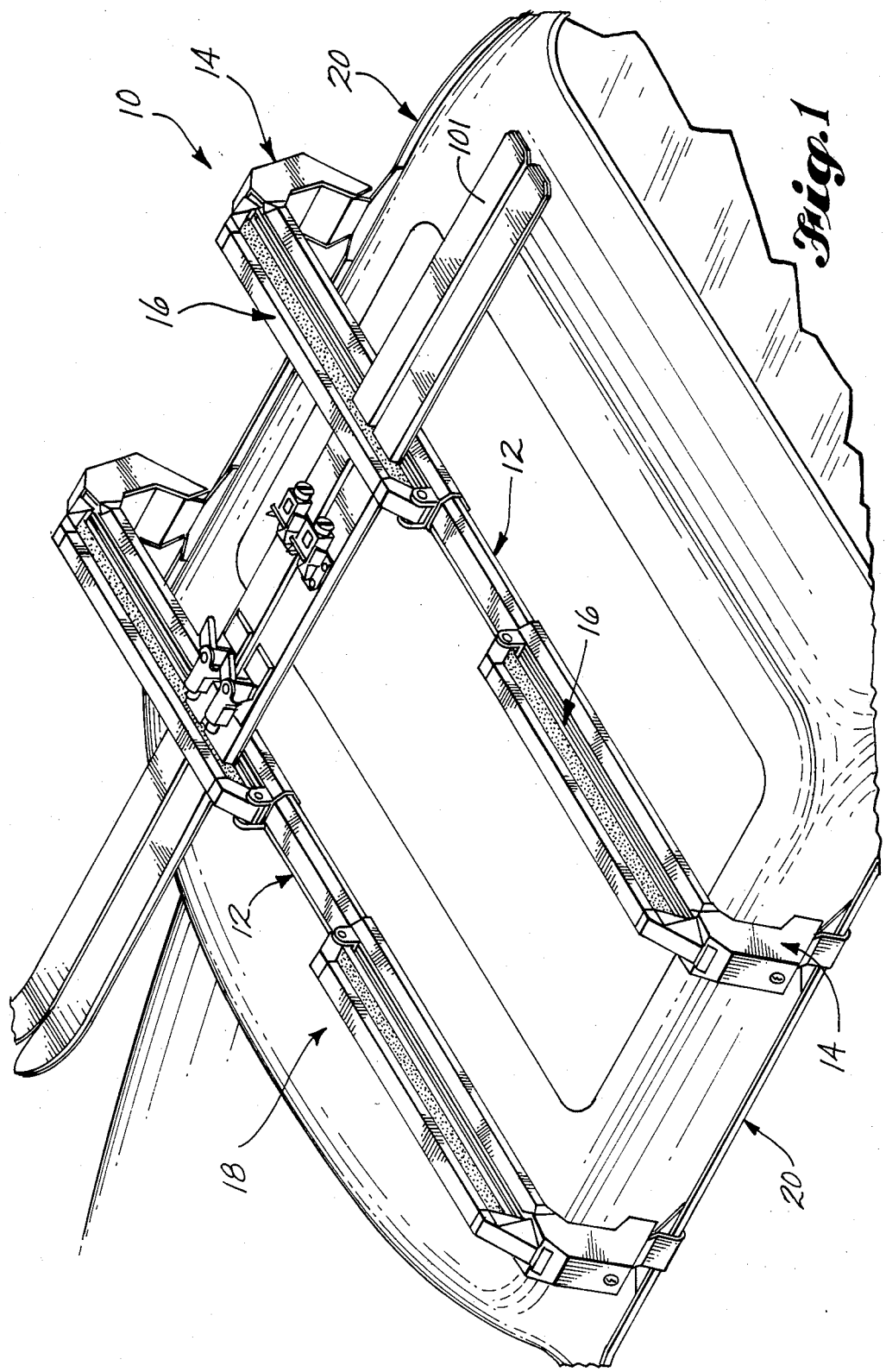
FIG. 1 is a fragmentary pictorial view showing a roof carrier, constructed in accordance with a preferred embodiment of the present invention, mounted to the roof of an automobile and carrying a pair of skis.

Referring now to the drawings, and first to FIG. 1, therein is shown at 10 an automobile roof carrier constructed in accordance with a preferred embodiment of the present invention. The roof carrier 10 has a pair of carrier bars 12. Each carrier bar is supported at each of its ends by a fastening device 14. Each carrier bar 12 supports an article carrier 16, which is interchangeably mounted to the carrier bar 12. The means by which each article carrier 16 is mounted to the carrier bars 12 will be described later. The fastening devices 14 attach the carrier bars 12 to the automobile roof 18 by means of connection to two generally trough shaped rain gutters 20, which run along the lateral borders of the roof. Directing attention now to FIGS. 2 and 5, the preferred construction of the fastening devices 14 will now be described. Such description will then be followed by a description of the interchangeable article carrier members 16, and the means by which such members are mounted to the carrier bars 12.

Each fastening device 14 comprises a supporting leg 22 having an upper portion 24, and a lower portion 26. An angled bracket member 28 pivotally connects the lower portion 26 to the upper portion 24. The bracket member 28 has a first arm portion 30 which is pivotally connected to a flange 32 of the upper portion 24 by a pin 34, or the like. A second arm portion 36 of the bracket member 28 is similarly connected by a pin 38 to the lower portion 26 of the supporting leg 22. The second arm portion 36 is inclined at an angle with respect to the first arm portion 30. The supporting leg lower portion 26 may be in the form of a swivel plate having a rain gutter-engaging end 40 which is shaped to fit adjacent the inner surface 42 of the rain gutter 20. The angle of the incline of the second arm portion 36 is sufficient so that the gutter-engaging end 40 will be positioned adjacent the inner surface 42 of the gutter 20. As is apparent from the drawings, the pin 34 provides a first axis about which the upper portion 24 of the supporting leg 22 may pivot. The pin 38 provides a second axis for pivotal movement of the lower portion 26 of the supporting leg 22. What this means is that the lower portion 26 of the supporting leg 22 has two degrees of freedom of pivotal movement relative to the upper portion. As was mentioned previously, this permits adaptation of the fastening device 14 to a variety of automobiles having sloping and nonparallel rain gutters.

The supporting leg 22 is secured to the rain gutter 20 by a clamping member 46. The clamping member 46 is generally spaced from the supporting leg 22, but has a first end 48 which abuts adjacent the upper portion 24 of the supporting leg, and a second end 50 which abuts against the outer surface 52 of the rain gutter trough. The second end 50 of the clamping member is shaped so that it will complimentarily fit adjacent such surface 52. A tightening screw 54 is provided for pressing the clamping member 46 toward the supporting leg 22. Such pressing causes reactionary forces to be set up at both the point where the clamping member's first end 48 abuts against the supporting leg upper portion 24, and the point where its second end 50 abuts adjacent the outer surface 52 of the rain gutter. Such reactionary forces permit the second end 50 to cooperate with the rain gutter-engaging edge 40 of the supporting leg's lower portion 26 to clamp the fastening device 14 to the rain gutter 20.

It may be appreciated that the upper portion 24 of the supporting leg 22 may assume various forms. In the embodiment shown in the various drawings throughout, and referring specifically now to FIG. 5, such upper portion 24 is constructed of a web portion 56 that connects a pair of flange portions 58, 60. Connected between the flanges 58, 60 is a support plate 62. The support plate 62 has a threaded bore 64 which receives the tightening screw 54. The tightening screw 54 may have an Allen-type fitting on its end for the purpose of tightening it against the clamping member 46.

The upper portion 24 of the supporting leg 22 is connected to the end of the carrier bar 12. The end of the carrier bar 12 is made of a hollow tubular member 66, which is preferably in the form of an aluminum extrusion. Received within the end of the hollow tubular member 66 are a pair of wedge-shaped members 68, 70 whose inclined surfaces 72, 74 are positioned adjacent each other. A pair of threaded bolts 76 extend through bores 78, 80, and 82 in the supporting leg upper portion 24, the outer wedge 70, and the inner wedge 68, respectively. The inner wedge 68 has a threaded portion with which the threads of the bolts 76 engage. An end portion 84 of the outer wedge 70 abuts against the end 86 of the hollow tubular member 66. Tightening the bolts 76 causes the inner and outer wedges 68, 70 to be pulled toward each other. Such pulling causes the inclined surfaces 72, 74 to direct the wedges 68, 70 against the inner surface 88 of the tubular member 66. This binds the wedges 68, 70 in place inside the tubular member, thereby connecting the upper portion 24 of the supporting leg 22 to the carrier bar 12.

The threaded bolts 76 also connect an outwardly projecting pivot clip 90 to the supporting leg upper portion 24. A housing 92 is pivotally connected to the pivot clip 90 by means of pin members 94, 96, which are connected to a pivot support 95. The pivot support 95 is connected to a block 97 formed as an integral part of the upper portion of the housing 92. The housing 92 is shaped to cover the upper part of the supporting leg 22 and includes a lock 98 which can latch or engage with a slot 99 in the flange portion 60 of the supporting leg's upper portion. The housing 92 can swing between an open or uncovering position and a closed or covering position. When the housing 92 is locked in the covering position, as shown in FIG. 2, the tightening screw 54 cannot be accessed.

An upper surface 100 of the supporting leg's upper portion 24 includes first and second end openings or slots 102, 104. Likewise, the pivot clip 90 also includes first and second end openings or slots 106, 108. The slots 106, 108 in the pivot clip are generally in vertical alignment with the slots 102, 104 in the top surface 100 of the supporting leg 22.

The top surface 110 of the hollow tubular member 66 is substantially flat and is connected to the supporting leg 22 so that such surface 110 is flush with the top surface 100 of the supporting leg. The interchangeable article carrier 16 is mounted, in a manner which will be explained later, to the top surface 110 of the outer tubular member 66.

As has been previously stated, the article carrier 16 is interchangeable. In the embodiment shown in the drawings, the article carrier 16 is shown designed for carrying a pair of pairs of skis 101. Referring now to FIG. 6, the article carrier 16 includes an elongated support member 112 which includes a hook 114 at one end, and a latching member 116 at the other end. Pivotally connected to the support member 112 is a keeper bar 118. The keeper bar 118 may swing back and forth between an open position away from the support member 112, and a closed position adjacent the support member as is shown in FIGS. 1–2 and 6–7. An end portion 120 of the keeper bar extends outwardly past the end of the support member 112 when the keeper bar is in the closed position. Connected to the end portion 120 is another latching member 122, which is used to latch the keeper bar in the closed position.

Figure 5:
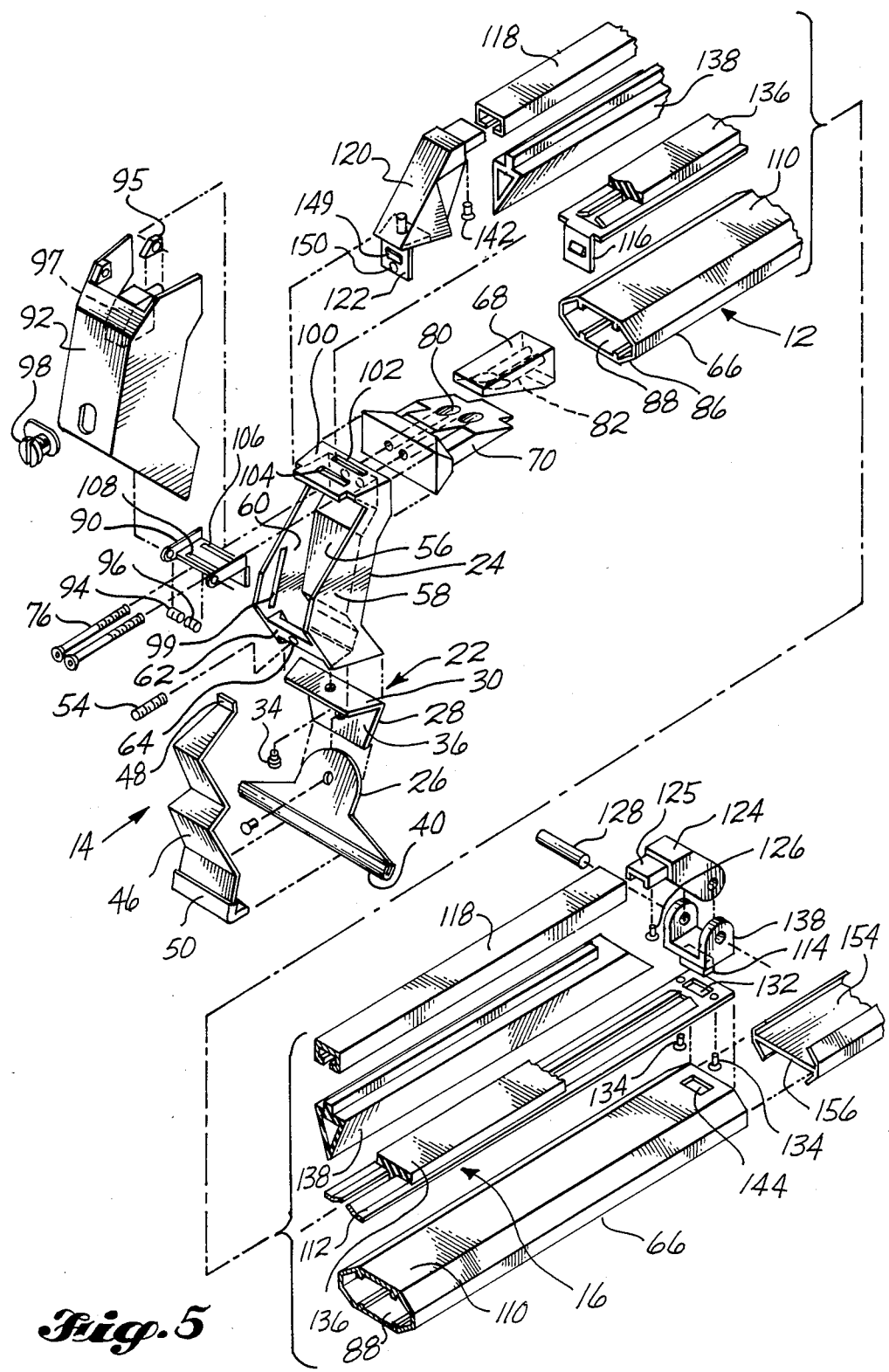
FIG. 5 is an exploded pictorial view of one of the fastening devices and an end of one of the carrier bars of the roof carrier shown in FIG. 1, and includes an exploded view of an interchangeable article carrier.

Referring now to the lower part of FIG. 5, the end of the keeper bar 118, which is pivotally connected to the support member 112, is attached to a hinge member 124 by an insert 125. The keeper bar 118 may also be in the form of a hollow extrusion and the insert 125 may be held in place inside the bar by a set screw 126, or the like. The hinge member 124 is pivotally connected by a pin 128 to a knuckle member 130. The hook 114 is connected to the lower portion of the knuckle member 130. The hook is inserted through a slot 132 in the end of the elongated support member 112, which is connected to the knuckle member 130 by screws 134. Rubber pads 136, 138 are connected to the support member 112 and the keeper bar 118, respectively, for gripping skis when the keeper bar is closed and latched. The pad 138 connected to the keeper bar 18 may be a hollow wedge-shaped rubber extrusion. The end portion 120 of the other end of the keeper bar 118 may be similarly connected to the keeper bar by an insert 140, which is held in place by a screw 142.

The article carrier 16 is mounted to the top surface 110 of the carrier bar 12 by means of a slot 144 located in such surface. To mount the article carrier 16, the hook 114 of the support member 112 is first inserted into the slot 144, and then its latching member 116 is inserted downwardly through slots 102 and 106. These slots 102, 106 are, of course, properly sized for permitting the insertion of the latching member 116 therethrough. The latching member 116 has a beaded portion 146 which catches the edge of the slot 106. It should be appreciated that instead of having an arrangement of two vertically aligned slots 102, 106 through which the latching member 116 is inserted, a single slot in the upper portion 24 of the supporting leg would suffice for the same purpose. This is not shown in the drawings, however.

The keeper bar 118 may be closed and latched in a similar fashion. Referring now to FIG. 9, arrow 148 shows the end portion 120 of the keeper bar being swung downwardly to close the keeper bar adjacent the support member 112. The latching member 122 of the keeper bar is inserted through slots 104 and 108 in the supporting leg's upper surface 100, and in the pivot clip 90. The keeper bar latching member 122 also includes a beaded portion 149 which catches the edge of the slot 108.

The latching members 116, 122 of both the support member 112 and the keeper bar 118 are flexible. Therefore, the latching members 116, 122 can be easily unlatched from their respective slots 106, 108 by merely bending them back in the manner shown in FIG. 7.

As can be seen from the drawings, when locked in position, the housing 92 makes both the tightening screw 54 and the latching members 116, 122 inaccessible. To further lock the article carrier 16 in place, the keeper bar latching member 122 has a socket opening 150 extending through its width. A pin 152 is connected to the block 97 in the upper part of the housing 92 and registers with the socket 150 when the housing is swung into covering position. This prevents either the accidental or purposeful unlatching of either latching member 116 or 122, unless the housing 92 is first swung into an open position as shown in FIGS. 7 and 9.

The carrier bar 12 is constructed of an inner elongated I-beam member 154 which is surrounded by the hollow tubular member 66. The I-beam 154 has a horizontal web portion 156 that connects a pair of flange portions 158, 160, respectively. In preferred form, each flange portion 158, 160 has a vertical portion 162 which is connected to the horizontal web 156. Each flange portion 158, 160 also has both an upwardly and inwardly directed portion 164, and a downwardly and inwardly directed portion 166. The ends of such portions 164, 166 are horizontal edges 172 which abut adjacent upwardly and downwardly projecting ribs 174, 176, which run along the length of the inner surface of the outer member 66. The outer tubular member 66 is shaped so that its inner surface is in sliding contact with the outer surfaces of the flange portions 162, 164, 166, and 172. This permits movement of the outer member 66 relative to the inner member 154, for the purpose of extending and retracting the carrier bar 12. This, of course, makes the carrier bar 12 adjustable for attachment to variously sized roofs. Once a carrier bar has been attached to the automobile roof 18, a bolt 178, received within a threaded portion 180 of the outer member 66, may be tightened to hold the inner and outer members 154, 66 in place relative to each other. It is to be understood, of course, that the inner member 154 would extend across the transverse width of the automobile roof. Each end portion of the inner member 154 would be received within a separate hollow outer member 66 connected to a fastening device 14.

The above described configuration of the carrier bar 12 gives it the ability to be constructed in a sturdy but lightweight manner. The horizontal web portion 154 of the I-beam 156 divides the carrier bar 12 into upper and lower chambers 168, 170. Therefore, the upper chamber 168 provides a space for receiving the hook 114 after it has been inserted through the slot 144 in the top surface 110 of the outer tubular member 66. The construction of the I-beam flange portions 158, 160, and the way in which the inner surface of the outer member 66 surrounds such portions thereby provide an extremely sturdy telescoping carrier bar.

It should be appreciated that the article carrier 16 described above would be interchangeable with article carriers of different construction. For example, instead of having a keeper bar 118 for a pair of skis 101, the article carrier may be provided with a mount for carrying a bicycle. If such is the case, it should be appreciated that such a carrier 16 may comprise a single support member 112 having only one latching member, instead of the two latching members 116, 122 shown in the drawings. If this is the case, then the support member 112 would be lengthened so that its latching member 116 would extend downwardly through the slots 104 and 108, instead of slots 102 and 106. Further, such latching member would also have a socket opening for registering with the pin 152. This embodiment is not shown in the drawings, however.

Further, it should be appreciated that various article carriers 16 can be interchanged on a carrier bar 12 without removing the carrier bar from the roof. This means that a person can use the roof carrier 10 for a variety of uses without removing it from the roof. For example, on one day the roof carrier 10 could be used for skiing. On another day the article carriers 16 could be interchanged, and the roof carrier 10 could be used for bicycling.

It is to be appreciated that the embodiment shown and described above is merely for illustrative purposes. The invention is not meant to be limited in any way by the above description. Be it known that the spirit and scope of the invention is to be limited only by the appended claims which follow, in accordance with the well-established doctrines of patent claim interpretation.

What is claimed is:

1. In an automobile roof carrier having an elongated carrier bar extending in a transverse direction across the automobile's roof, said carrier bar being supported at each end by a supporting leg attached to a generally trough-shaped rain gutter on a lateral border of the roof, said supporting leg comprising:

an upper member fixedly connected to the carrier bar;

a lower member having a rain gutter-engaging end shaped to fit adjacent an inner surface of said rain gutter through;

a connecting member having a portion pivotally connected to said upper member, and having another portion pivotally connected to said lower memberr, wherein said pivotally connection between said upper member and said connecting member is defined by a first axis extending generally upwardly relative to said roof, and wherein said pivotal connection between said lower member and said connecting member is defined by a second axis extending generally laterally outwardly relative to said roof, in a manner so that pivotal movement of said upper member relative to said connecting member permits adjustment of the transverse direction of said carrier bar relative to said lower member's rain gutter-engaging end, and so that pivotal movement of said lower member relative to said connecting member permits vertical adjustment of said upper member and said carrier bar relative to said rain gutter-engaging end;

a clamping member having a lower end portion positioned in abutting relationship against an outside surface of said rain gutter trough, said lower end portion being shaped to complementarily fit adjacent said trough's outside surface; and including means, connected to said upper member, for forcing said clamping member's lower end portion against said trough's outside surface, thereby causing said clamping member to cooperate with said lower member's gutter-engaging end to clamp said supporting leg to said rain gutter.

2. The supporting leg of claim 1, wherein said connecting member comprises an angled bracket member positioned between said upper and lower members and having a first generally horizontal arm portion pivotally connected to said upper member, and having a second arm portion pivotally connected to said lower member, said second arm portion generally depending downwardly at an incline relative to said first arm portion.

3. The supporting leg of claim 2, wherein said clamping member has an upper end portion positioned in abutting relationship against a portion of said upper member, and said clamping member has a body portion interconnecting said clamping member's lower end portion and said upper end portion, said body portion being generally spaced from said upper member and said angled bracket member and said lower member, wherein said forcing means presses said body portion generally toward said upper member and said angled bracket member and said lower member, to cause said clamping member's end portions to be respectively forced against said portion of said upper member and said trough's outer surface, thereby causing said clamping member's lower end portion to cooperate with said lower member's gutting-engaging end to clamp said supporting leg to said rain gutter.

4. The supporting leg of claim 3, wherein said forcing means comprises a tightening screw threadedly connected to said upper member in a manner so that tightening said screw causes said screw to abut against and press said clamping member's body portion generally toward said upper member and said bracket member and said lower member.

5. In an automobile roof carrier having an elongated carrier bar extending across the automobile's roof, for transporting an article, an apparatus for mounting said article to said carrier bar, comprising:

an elongated article support member having a bottom surface which rests upon a horizontal top surface of said carrier bar, said article support member further having a top surface upon which said article rests during transport, and including a hook-shaped member connected to said article support member's bottom surface adjacent one end thereof, and a generally vertical downwardly depending latching member fixedly connected to said article support member's bottom surface adjacent the other end thereof, wherein said top surface of said carrier bar has a first opening and a second opening, said second opening being spaced from said first opening a distance substantially corresponding to the distance between said hook-shaped member and said latching member, said hook-shaped member extending downwardly through said first opening and below said carrier bar's top surface, and further extending outwardly below said bar's top surface in a direction away from said latching member, said latching member extending vertically downwardly through said second opening in said bar and below said bar's top surface, and including first holding means, positioned below said bar's top surface, for holding said latching member in such position, said first holding means including a beaded portion of the end of said latching member, said beaded portion projecting outwardly in a direction away from said hook-shaped member and being positioned in a manner to catch an edge of said second opening after said latching member has been inserted therethrough, and wherein said latching member is sufficiently flexible in a direction toward said hook-shaped member that said latching member may be elastically bent a slight amount away from a normal position while said beaded portion of said latching member is inserted through said second opening, to permit said beaded portion to bypass said second opening's edge, and in response to spring forces in said latching member caused by such elastic bending, said latching member returns to said normal position after insertion through said second opening so that said beaded portion catches said second opening's edge, and further including means for connecting said article to said top supporting surface including an elongated keeper bar having a first end pivotally connected to said elongated article support member, in a manner so that said keeper bar can swing back and forth between a closed position adjacent said top supporting surface of said article support member, and an open position away from such surface, said keeper bar having a second end that extends outwardly from the latching member end of said article support member when said keeper bar is in said closed position, said second end also having a generally vertical downwardly depending keeper bar latching member fixedly connected thereto, said keeper bar latching member being generally parallel relative to said latching member of said support member when said keeper bar is closed, wherein said horizontal top surface of said carrier bar further includes a third opening positioned in such top surface outwardly from said second opening, and wherein said keeper bar latching member extends vertically downwardly through said third opening and below said bar's horizontal top surface when said keeper bar is closed, and including second means, positioned below said bar's top surface, for holding said keeper bar's latching member in such position, said second holding means including a beaded portion of the end of said keeper bar latching member, such beaded portion projecting outwardly in a direction away from said hook-shaped member of said article support member, and such beaded portion being positioned to catch an edge of said third opening after said keeper bar latching member has been inserted through said third opening, said keeper bar latching member being sufficiently flexible in a direction toward said hook-shaped member that such latching member may be elastically bent a slight amount away from a normal position while its beaded portion is inserted through said third opening, to permit such beaded portion to bypass said third opening's edge, and in response to spring forces in said keeper bar latching member caused by such elastic bending said keeper bar latching member returns to said normal position after insertion through said third opening, so that such beaded portion catches said third opening's edge, and wherein said first and second holding means are positioned in a finger-accessible area below said horizontal top surface of said carrier bar, and including a housing pivotally connected to said carrier bar in a manner so as to swing between a position covering said finger-accessible area and another position uncovering said area, wherein said keeper bar latching member includes a socket opening positioned below said horizontal surface, and including a pin member mounted to said housing in a position so that when said housing is swung into said covering position said pin member is directed inwardly into engagement with said socket opening, and including means for locking said cover in said covering position, to prevent unauthorized access to said finger-accessible area.

* * * * *